Aug. 18, 1936.  C. R. PATON  2,051,571
MOTOR VEHICLE
Filed June 29, 1934
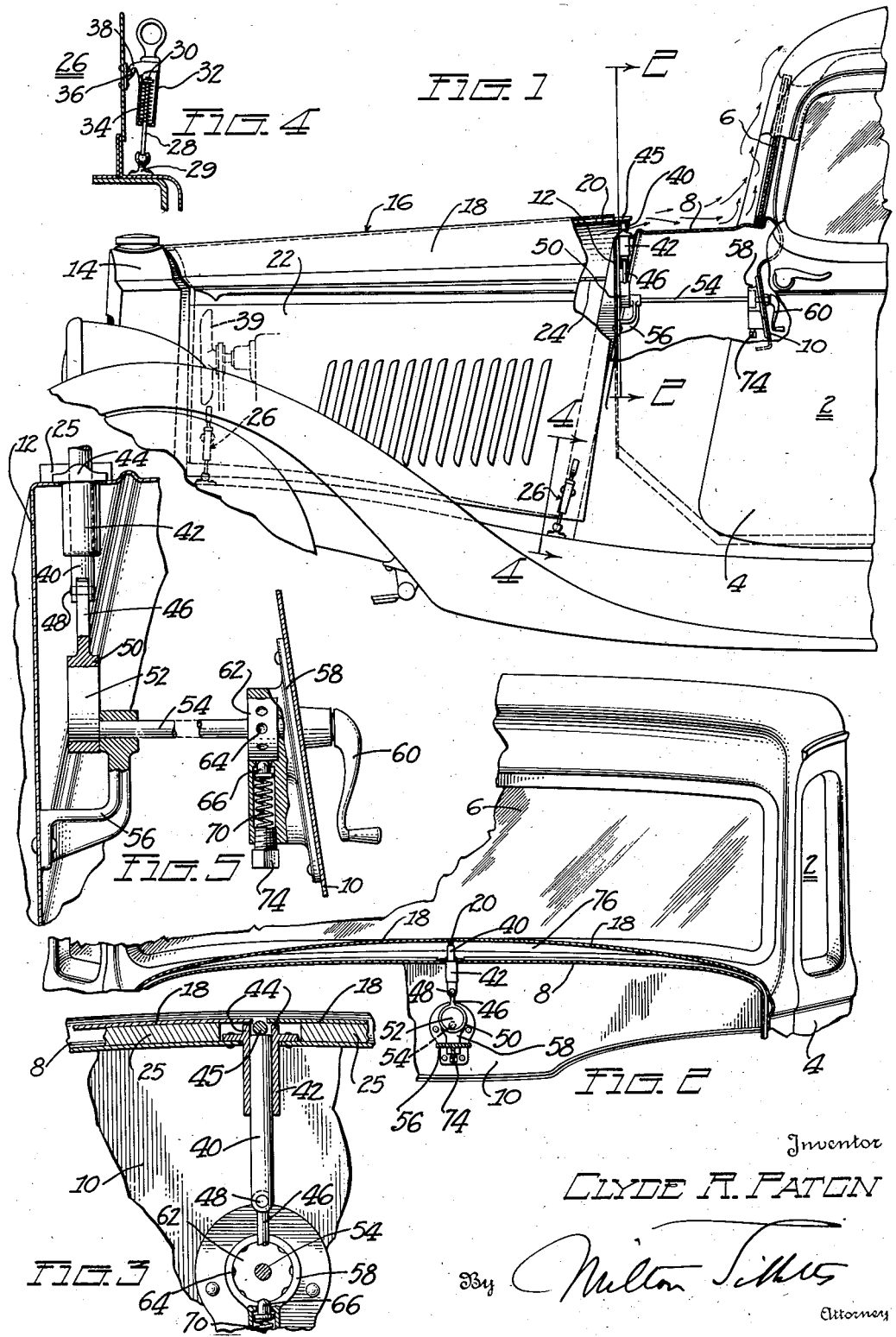

Patented Aug. 18, 1936

2,051,571

UNITED STATES PATENT OFFICE 2,051,571

MOTOR VEHICLE

Clyde R. Paton, Birmingham, Mich., assignor to Packard Motor Car Company, Detroit, Mich., a corporation of Michigan Application June 29, 1934, Serial No. 733,047

9 Claims. (Cl. 20—40.5)

This invention relates to motor vehicles and, more particularly, to means for heating the windshields of such vehicles.

In the operation of motor vehicles in cold weather, a coating of ice often forms on the outside of the windshield glass which cannot be removed by the operation of the windshield wiper. This coating obscures the vision of the driver and renders the operation of the vehicle dangerous. In order to drive with safety, the driver must stop the vehicle frequently and get out and remove manually the coating of ice. A large supply of heat is available from the engine to heat the windshield and various devices have been produced for directing a portion of the heated air from within the bonnet against the windshield to maintain the same free from ice. The devices for accomplishing this result, of which applicant is advised, have been complicated in construction and expensive to manufacture and the application of the same to motor vehicles of the character at present in common commercial use would involve substantial changes in the structure of such vehicles.

One object of the present invention is to improve the construction and mode of operation of devices for directing heated air from within the bonnet of a motor vehicle against the windshield and to produce a device of this character which is simple in construction and inexpensive to manufacture and which will operate effectively to cause the heating of the windshield sufficiently to maintain the same free from ice in cold weather.

Another object of the invention is to produce an improved and efficient construction for directing heated air from within the bonnet of a motor vehicle against the windshield which may be applied to motor vehicles of the type at present in common commercial use without making substantial changes in the structure of the vehicles.

Another object of the invention is to produce a construction by which the rear margin of the bonnet of a motor vehicle may be lifted away from the cowl to form an opening through which the heated air from within the bonnet is projected against the windshield.

With the above and other objects in view, the invention consists in a construction embodying the novel and improved features hereinafter described and particularly pointed out in the claims, the advantages of which will be readily understood by those skilled in the art.

The invention will be clearly understood from the accompanying drawing illustrating the invention in its preferred form and the following detailed description of the constructions therein shown.

In the drawing, Fig. 1 is a view in side elevation, with certain parts broken away and certain parts shown in section of a portion of a motor vehicle embodying the invention;

Fig. 2 is a view in vertical section taken substantially on the line 2—2 of Fig. 1;

Fig. 3 is a detail sectional view taken in a plane substantially parallel with the plane on which Fig. 2 is taken and illustrating particularly the mechanism for lifting the rear portion of the bonnet;

Fig. 4 is a detail sectional view taken substantially on the line 4—4 of Fig. 1 and;

Fig. 5 is a detail view partly in side elevation and partly in section and illustrating the bonnet lifting mechanism.

The invention is shown in the present application as embodied in a motor vehicle comprising a body indicated generally at 2, having a side door 4 in the forward portion thereof, a windshield 6, and sheathing forming a cowl 8, extending forwardly from the windshield. The body is provided with an instrument board 10 within the body, and with a dash 12 located at the forward end of the body. The vehicle also comprises a radiator 14 and a bonnet 16 extending from the radiator to the dash and overlapping at its rear margin the forward margin of the cowl. The bonnet is provided with two upper sections 18 hinged together at 20 and with side sections 22 hinged to the top sections at 24 and depending therefrom.

Yielding anti-rattle strips 25 preferably are interposed between the rear margins of the several sections of the bonnet and the forward margin of the cowl as shown in Fig. 3.

The side sections 22 of the bonnet are yieldingly held in closed positions by means of hold-down devices or clamps 26. Each of these hold-down devices comprises a rod 28 connected by a universal joint to a bracket 29 secured to one of the side members of the chassis frame and having a head 30, a cylinder 32 mounted to slide longitudinally on the rod 28, a coiled spring 34 interposed between the head 30 and the base of the cylinder, and an "eye" 36 secured to the side section of the bonnet and arranged to be engaged by a hook 38 on the cylinder 32. This construction enables the side sections of the bonnet to yield upwardly with relation to the side members of the vehicle frame.

The vehicle is provided with the usual fan 39 for drawing the air through the radiator. The air within the bonnet is impelled rearwardly with considerable force by the action of the fan.

In order to form an opening for the passage of heated air from within the bonnet rearwardly against the windshield, the rear portion of the bonnet is lifted. This lifts the rear margins of the sections 18 of the bonnet away from the cowl to provide an opening between the same. In the present form of the invention the mechanism for lifting the rear portion of the bonnet comprises a rod, or plunger, 40 mounted to slide longitudinally in a guide member 42 secured to the forward margin of the cowl. The guide member 42 is provided at its upper end with spaced projections 44 arranged to receive between them one end of the bonnet hinge pin 45, as clearly shown in Fig. 3. The upper end of the rod 40 is arranged to engage the said hinge pin.

In lifting the rear margins of the sections 18 of the bonnet away from the forward margin of the cowl, the rod 40 is moved upwardly in the guide 42. In order to produce the required upward movement of the rod, an eccentric rod 46 is pivotally connected at 48 to the lower end of the rod 40 and is provided with an eccentric strap 50 at its lower end, which surrounds an eccentric 52. The eccentric 52 is fixed to the forward end of a shaft 54, rotatably mounted in bearings formed respectively on a bracket 56 secured to the dash and on a member 58 secured to the instrument board. A crank handle 60 is mounted on the rear end of the shaft 54 to enable the same to be manually rotated by a person within the body of the vehicle.

In order to hold the shaft 54 in adjusted position, a disc 62 is secured to the shaft and is provided on its periphery with a series of rounded depressions 64 which are arranged to be engaged by the rounded end of a spring pressed detent pin 66. This pin is mounted for longitudinal movement in a bore in the member 58 and is yieldingly pressed into engagement with the disc 52 by means of a coiled spring 70. The pressure of this spring on the pin may be adjusted by means of an adjusting screw 74 threaded into the bore in which the pin is mounted.

Fig. 3 shows the position of the parts when the rear margins of the sections 18 of the bonnet are in their normal lowered positions, the said margins of said sections then engaging the yielding anti-rattle strips 25. When it is desired to lift the rear margins of the sections 18 away from the forward margin of the cowl to direct the heated air from within the bonnet against the windshield, the shaft 54 is rotated by means of the crank handle 60 to lift the rod 40. The lifting of said rod will raise the rear margins of the sections 18 of the bonnet and will form an opening between said sections and the cowl as shown in Fig. 2 and indicated at 76. The extent to which the sections 18 are lifted and the size of the opening thus produced may be regulated by the extent of the turning movement of the shaft 54. Through the opening between the rear margin of the bonnet and the forward margin of the cowl thus produced, the heated air within the bonnet will be driven by the impulse of the fan rearwardly against the windshield, as indicated by the arrows in Fig. 1. This will heat the windshield and will remove any ice which may have formed thereon, and will prevent the further formation of ice on the windshield while the opening is maintained. The heating of the windshield also prevents the condensation of moisture on the same within the vehicle, which also obscures the vision and makes it necessary to wipe the windshield on the inside.

The yielding of the springs 34 of the hold-down devices acting on the respective side sections 22 of the bonnet will allow the rear portions of these side sections to be lifted slightly during the lifting of the rear margins of the sections 18. The yielding of the anti-rattle strips 25 will also accommodate, to a certain degree, the upward movement of the rear margins of the sections 18 of the bonnet.

It is to be understood that the invention is not limited to the particular construction and arrangement of parts of the illustrated embodiment of the invention, but that the construction shown and described is merely illustrative of the invention and that the invention may be embodied in other forms within the scope of the claims.

Having explained the nature and object of the invention and having specifically described the construction embodying the invention in its preferred form, what is claimed is:

1. A construction for motor vehicles comprising a cowl, a bonnet having its rear margin joining the forward margin of the cowl, means accessible from within the vehicle for lifting a portion of the rear margin of the bonnet away from the forward margin of the cowl and means for holding the forward margin of the bonnet closed while said portion is lifted.

2. A construction for motor vehicles comprising a bonnet, a shaft extending longitudinally of a vehicle, means on the forward end of the shaft for lifting a portion of the rear margin of the bonnet, means on the rear end of said shaft and accessible from within the vehicle, for rotating the shaft and means for maintaining other portions of the forward and rear margins of the bonnet closed while said portion is lifted.

3. In combination with a motor driven vehicle having a cowl and bonnet, a windshield heater comprising a vertically movable means engageable with the rear end of said bonnet, a cam for vertically adjusting said means to raise or lower the rear end of said bonnet relative to said cowl, and manually operable mechanism for actuating said cam.

4. In combination with a motor driven vehicle having a cowl and a centrally hinged bonnet partly overlying said cowl, of means for jacking the rear end of said bonnet to direct engine heated air against the vehicle windshield comprising a lifter means engageable with the rear hinge portion of said bonnet, and manually operable mechanism connected to raise and lower said lifter means.

5. In combination with a motor driven vehicle having a cowl and a bonnet partly overlying said cowl, of means for lifting the rear end of said bonnet above said cowl to direct engine heated air against the windshield comprising a cam shaft manually operable from within the vehicle body, mechanism engageable with the rear under side of said bonnet associated to be raised and lowered by said cam shaft, and means for retaining said cam shaft in a plurality of positions of rotation.

6. In a motor driven vehicle, a cowl, an engine bonnet partially overlying said cowl, a dash, an instrument board, bracket means fixed on said dash and said instrument board, a manually operable shaft supported by said brackets and extending through said instrument board, lifter means engageable with the under rear end of said bonnet, and a cam fixed on said shaft in operative relation with said lifter means.

7. In a motor driven vehicle, a cowl, an engine bonnet overlying said cowl at its rear end, a plunger engageable with the under rear end of said bonnet to lift it above said cowl for directing engine heated air toward the vehicle windshield, a guide for the plunger fixed to the under side of said cowl, and mechanism for raising and lowering said plunger.

8. A construction for motor vehicles comprising a cowl, a motor bonnet having its rear edge normally engaging the forward edge of the cowl in overlapping relation, means for fixing the lower edges of the bonnet to the vehicle, means enclosed by the fixed bonnet for raising and lowering the upper rear edge thereof to form an opening between the bonnet and the cowl, and means operable from within the vehicle for actuating said bonnet raising and lowering means.

9. In combination with a motor driven vehicle having a cowl and a bonnet, windshield heating means comprising a vertically movable means engageable with the rear end of said bonnet, a cam for vertically adjusting said movable means to raise or lower the rear end of said bonnet relative to said cowl, and means operable to actuate said cam.

CLYDE R. PATON.